US005473881A

United States Patent [19]

Kramnik et al.

[11] Patent Number: 5,473,881

[45] Date of Patent: Dec. 12, 1995

[54] LOW EMISSION, FIXED GEOMETRY GAS TURBINE COMBUSTOR

[75] Inventors: Boris M. Kramnik, Skokie; Walter Kunc, Clarendon Hills, both of Ill.

[73] Assignee: Westinghouse Electric Corporation, Orlando, Fla.

[21] Appl. No.: 249,545

[22] Filed: May 26, 1994

Related U.S. Application Data

[63] Continuation of Ser. No. 66,787, May 24, 1993, abandoned.

[51] Int. Cl.[6] .............................. F02C 1/00; F02G 3/00

[52] U.S. Cl. .............................. 60/39.02; 60/39.06; 60/737; 60/740; 60/746

[58] Field of Search .............................. 60/39.02, 39.03, 60/39.06, 733, 737, 738, 740, 746

[56] References Cited

U.S. PATENT DOCUMENTS

| | | | |
|---|---|---|---|
| 2,332,866 | 10/1943 | Muller | 60/746 |
| 4,041,699 | 8/1977 | Schelp | 60/737 |
| 4,110,973 | 9/1978 | Haeflich et al. | 60/39.05 |
| 4,154,571 | 5/1979 | Pariani | 431/186 |
| 4,192,139 | 3/1980 | Buchheim | 60/746 |
| 4,255,927 | 3/1981 | Johnson et al. | 60/39.23 |
| 4,292,801 | 10/1981 | Wilkes et al. | 60/39.06 |
| 4,420,929 | 12/1983 | Jorgensen et al. | 60/737 |
| 4,597,264 | 7/1986 | Cipolla | 60/602 |
| 4,628,687 | 12/1986 | Ström | 60/39.23 |
| 4,766,721 | 8/1988 | Iizuka et al. | 60/39.23 |
| 4,773,846 | 9/1988 | Munk | 431/4 |
| 4,845,952 | 7/1989 | Beebe | 60/737 |
| 4,891,936 | 1/1990 | Shekleton et al. | 60/746 |
| 4,910,957 | 3/1990 | Moreno et al. | 60/737 |
| 4,966,001 | 10/1990 | Beebe | 60/737 |
| 5,013,236 | 5/1991 | Khinkis | 431/10 |
| 5,054,280 | 10/1991 | Ishibashi et al. | 60/39.06 |
| 5,097,666 | 3/1992 | Shekleton et al. | 60/737 |
| 5,121,597 | 6/1992 | Urushidani et al. | 60/39.06 |
| 5,125,227 | 6/1992 | Ford et al. | 60/39.23 |
| 5,140,820 | 8/1992 | Booz | 60/737 |
| 5,220,794 | 6/1993 | Sledd et al. | 60/737 |

FOREIGN PATENT DOCUMENTS

| | | | |
|---|---|---|---|
| 0062149 | 10/1982 | European Pat. Off. | 60/746 |
| 0161561 | 11/1985 | European Pat. Off. . | |
| 0266857 | 5/1988 | European Pat. Off. | 60/746 |
| 1230621 | 9/1960 | France . | |
| 3305254 | 8/1984 | Germany . | |
| 3835415 | 5/1989 | Germany . | |
| 2021201 | 11/1979 | United Kingdom . | |

OTHER PUBLICATIONS

Carlstrom et al., "Improved Emissions Performance in Today's Combustion System", General Electric AEG/SOA 7805, pp. 17–18, Jun. 1978.

*Primary Examiner*—Richard A. Bertsch
*Assistant Examiner*—Howard R. Richman
*Attorney, Agent, or Firm*—Speckman, Pauley & Fejer

[57] ABSTRACT

A fixed geometry combustor for a gas turbine comprising at least one combustion chamber, a dilution chamber disposed downstream of said combustion chamber and in communication with said combustion chamber, at least one primary inspirator for introducing a fuel/air mixture into said combustion chamber in communication with said combustion chamber, and means for introducing dilution air into the dilution chamber.

29 Claims, 2 Drawing Sheets

LOW EMISSION, FIXED GEOMETRY GAS TURBINE COMBUSTOR

This application is a continuation of application Ser. No. 08/066,787, filed 24 May 1994, now abandoned.

BACKGROUND OF THE INVENTION

1. Field of the Invention

This invention relates to a fixed geometry gas turbine combustor which produces very low $NO_2$, CO, and total hydrocarbon emissions in which the flow of combustion air and dilution air is redistributed over the entire range of operation of the gas turbine using a pneumatic valve in the form of an inspirator.

2. Description of the Prior Art

Increasing concern about acid rain and ambient air quality has accelerated the development of ultra-low emission, natural gas combustion technologies for use in boilers, furnaces, incinerators, and more recently, gas turbines. This concern is focused not only on the oxides of sulfur and nitrogen, but also on carbon monoxide and total reactive hydrocarbons.

Of all the pollutants resulting from natural gas combustion, experience has shown that $NO_x$ has been the most difficult to minimize from a practical standpoint. Various approaches have been developed for reducing $NO_x$ emissions. However, the resulting reduction is insufficient in many cases to satisfy stringent air quality standards. Common modifications to natural gas combustion processes reduce $NO_x$ emissions at the expense of reduced equipment efficiency and very often at the expense of increased carbon monoxide (CO) and total reactive hydrocarbon emissions.

The basic approaches for lowering $NO_x$ emissions focus on reducing the concentration of free oxygen, residence time, and combustion temperature in the combustion zone. Various proven practical combustion technologies for reducing $NO_x$ formation include injection of diluents into the combustion zone, such as excess air, steam and water, homogeneous combustion, staged firing, recirculation of combustion products and flue gases, and heat removal from the flame. However, the only practical approach that has reduced $NO_x$ emissions to single digit levels is premixed combustion. Accordingly, an advanced dry combustor to achieve ultra-low emissions for all combustion pollutants, that is, $NO_x$, carbon monoxide, and total reactive hydrocarbons, would apply the following techniques: Fuel/air premixing; high excess air combustion; and intensive turbulence, mixing and combustion products recirculation.

When such a combustor is applied to a gas turbine, several problems arise due to the specific environment required by a gas turbine combustor. Among the problem areas are: performance of the combustor when operating at high turndown over the entire range when the gas turbine operation changes from full load to idle; capability of the combustor to meet the requirements for gas turbine combustor applications, such as combustion intensity and pressure drop across the combustor; and maintaining the required combustor wall temperature over the entire operating range.

A one-shaft gas turbine is operated in such a way that total air flow is maintained constant over the entire range of turbine operation while the fuel flow rate drops from 100% at full load to about 25% at idle. This corresponds to a change in the stoichiometric amount of air required for complete combustion of the amount of fuel present from about 2.5 at full load to about 9.5 at idle.

Based on overall performance required by a gas turbine combustor, including operating range, combustion intensity, pressure drop and turndown control, certain combustor geometry options are available which produce ultra-low emissions. One such option is a fixed geometry combustor, the major advantage of which is that the gas turbine will not have any moving parts inside the pressurized machine. This is very important from the point of view of the overall turbine reliability and availability. U.S. Pat. No. 5,121,597 teaches a fixed geometry gas turbine combustor having a combustion sleeve, a combustion sub-chamber disposed at an upstream end of the combustion sleeve with an air and fuel supply system, and a main combustion chamber disposed downstream of the sub-chamber and having an air and fuel supply system, and formed in such a manner that the start up of the gas turbine is effected by the hot combustion gas generated in the sub-chamber. A fuel nozzle is provided in the sub-chamber for injecting the fuel during a change in the gas turbine rotational speed. As a result, the flow rate of fuel supplied to the nozzle for combustion in the sub-chamber, even during startup acceleration of the gas turbine, does not increase.

U.S. Pat. No. 5,054,280 teaches a fixed geometry gas turbine combustor having an auxiliary burner provided in the interior of a first-stage combustion chamber located upstream of the combustor, the auxiliary burner being fired to hold the flame formed in the first-stage combustion chamber and being extinguished to cause the first-stage combustion chamber to serve as a premixing chamber. When the auxiliary burner is fired, a diffusion-combustion flame and premixed flame are formed in the first-stage combustion chamber and second-stage combustion chamber, respectively. When the auxiliary burner is extinguished, the premixture formed in the first-stage combustion/premixing chamber together with the second-stage premixed combustion flame maintains the flame within the second-stage combustion chamber, whereby the first-stage fuel also undergoes premixed combustion. In this manner, fuel introduced into the first and second stages undergoes complete premixed combustion.

U.S. Pat. No. 4,292,801 teaches a fixed geometry dual stage-dual mode combustor for a combustion turbine having a first and second combustion chamber interconnected by a throat region in which fuel and air are introduced into the first combustion chamber for premixing therein. Additional fuel and air are introduced near the downstream end of the first combustion chamber and additional air is introduced in the throat region for combustion in the second combustion chamber.

U.S. Pat. No. 4,773,846 teaches the use of an ultrasonic fog generator for injecting a fog into the air introduced into a combustion chamber in order to improve the efficiency of the combustion chamber and/or reduce the noxious emissions in the exhaust of the combustion chamber. Means for controlling the fog generator include a pneumatic control system responsive to a control signal for controlling the supply of compressed air and the supply of water to the fogging device.

A second geometry option for a gas turbine combustor is a variable geometry combustor. See, for example, U.S. Pat. No. 4,766,721 which teaches a two-stage variable geometry combustor for a gas turbine in which fuel is supplied from primary fuel nozzles for combustion in a primary combustion chamber under low load conditions and premixed fuel/air is supplied to a secondary combustion chamber downstream of the primary combustion chamber, enabling combustion in both the primary and secondary combustion chambers under high load operating conditions. An air-bleed passageway is provided on the downstream side of air openings for intake of secondary combustion air to be mixed with the secondary fuel and communicates with the outside of the combustor. The air-bleed passageway is provided with a regulating valve whereby secondary combustion air, under low load operating conditions, is bled from the secondary combustion air supply so that the fuel/air ratio of the secondary premixed mixture does not become excessively lean under low load operating conditions. U.S. Pat. No. 5,125,227 teaches a variable geometry combustion system for a gas turbine having a fuel nozzle displaceable within a venturi section of the gas turbine combustor, thereby altering the gap in the venturi section to vary performance and stability in the combustor and reduce $NO_x$ emissions. A variable geometry combustor for gas turbines is also disclosed by U.S. Pat. No. 4,255,927 which teaches a combustion system for a gas turbine in which excess air is injected into the reaction zone of the combustor to produce a desired air/fuel mixture which lowers combustion temperature and, thus, $NO_x$ emissions. A control mechanism consisting of a valve control unit is disposed external to the turbine and is used to control combustion efficiency over a wide range of turbine load by directing air flow in an inverse relationship from a compressor between the reaction zone and the dilution zone of the combustor. A variable geometry approach is also taught by U.S. Pat. No. 4,597,264 which teaches a device for regulating the supercharging of an engine in which a pneumatically controlled pressure limiting valve is disposed in a branch of the supply duct of a turbine of a turbo compressor unit and operated to regulate the flow rate of gas supplied to the turbine.

The main disadvantage of variable geometry combustors is the need to have a valve inside the machine. As a result, any valve repair or replacement would require a shutdown of the turbine.

Another approach for reducing $NO_x$ emissions is taught by U.S. Pat. No. 4,110,973 which teaches a gas turbine engine power plant having a water injection system consisting of a water/fuel mixing device for injecting water into the engine as it is conducted to the engine combustion chambers.

None of the fixed geometry gas turbine combustors known to us are able to operate with ultra-low $NO_x$ emissions over the entire range of turbine operation.

SUMMARY OF THE INVENTION

Accordingly, it is an object of this invention to provide a fixed geometry gas turbine combustor capable of producing ultra-low $NO_x$ emissions over the entire range of turbine operation.

It is another object of this invention to provide a fixed geometry gas turbine combustor having a high turndown over the entire range of operation when the gas turbine operation changes from full load to idle.

It is yet another object of this invention to provide a fixed geometry gas turbine combustor in which total air flow within the combustor is redistributed based on the amount of incoming fuel in order to maintain an air/fuel ratio within a range that allows stable operation of the combustor with ultra-low $NO_x$ emissions.

It is yet another object of this invention to provide a fixed geometry gas turbine combustor which will allow stable operation of the combustor with a high turndown over the entire range of operation without having any moving parts inside the pressurized machine and which produces ultra-low $NO_x$ emissions.

These and other objects of this invention are achieved in a fixed geometry combustor for a gas turbine comprising at least one combustion chamber wall defining at least one combustion chamber having an upstream end and a downstream end and a dilution chamber wall defining a dilution chamber disposed downstream of said at least one combustion chamber and in communication with said at least one combustion chamber. The downstream end of the dilution chamber is in communication with a gas turbine inlet. Means for introducing a mixture of fuel and combustion air into said at least one combustion chamber are provided as are means for introducing dilution air into the dilution chamber. The means for introducing the fuel/air mixture into said at least one combustion chamber in accordance with one embodiment of this invention comprises at least one primary inspirator in communication with said at least one combustion chamber.

In accordance with one embodiment of this invention, said means for introducing said fuel/air mixture into said at least one combustion chamber further comprises at least one primary nozzle secured to said combustion chamber wall, the primary nozzle in communication with said at least one combustion chamber.

For introduction of dilution air into the dilution chamber disposed downstream of said at least one combustion chamber, each of said at least one combustion chamber wall and the dilution chamber wall forms an annular passage around said at least one combustion chamber and the dilution chamber, respectively. The annular passage is in communication with the dilution chamber. Means for introducing dilution air into the annular passage in communication with the annular passage are provided.

DESCRIPTION OF THE DRAWINGS

These and other features of this invention will be better understood from the following detailed description taken in conjunction with the figures wherein.

DESCRIPTION OF PREFERRED EMBODIMENTS

Figure 1:
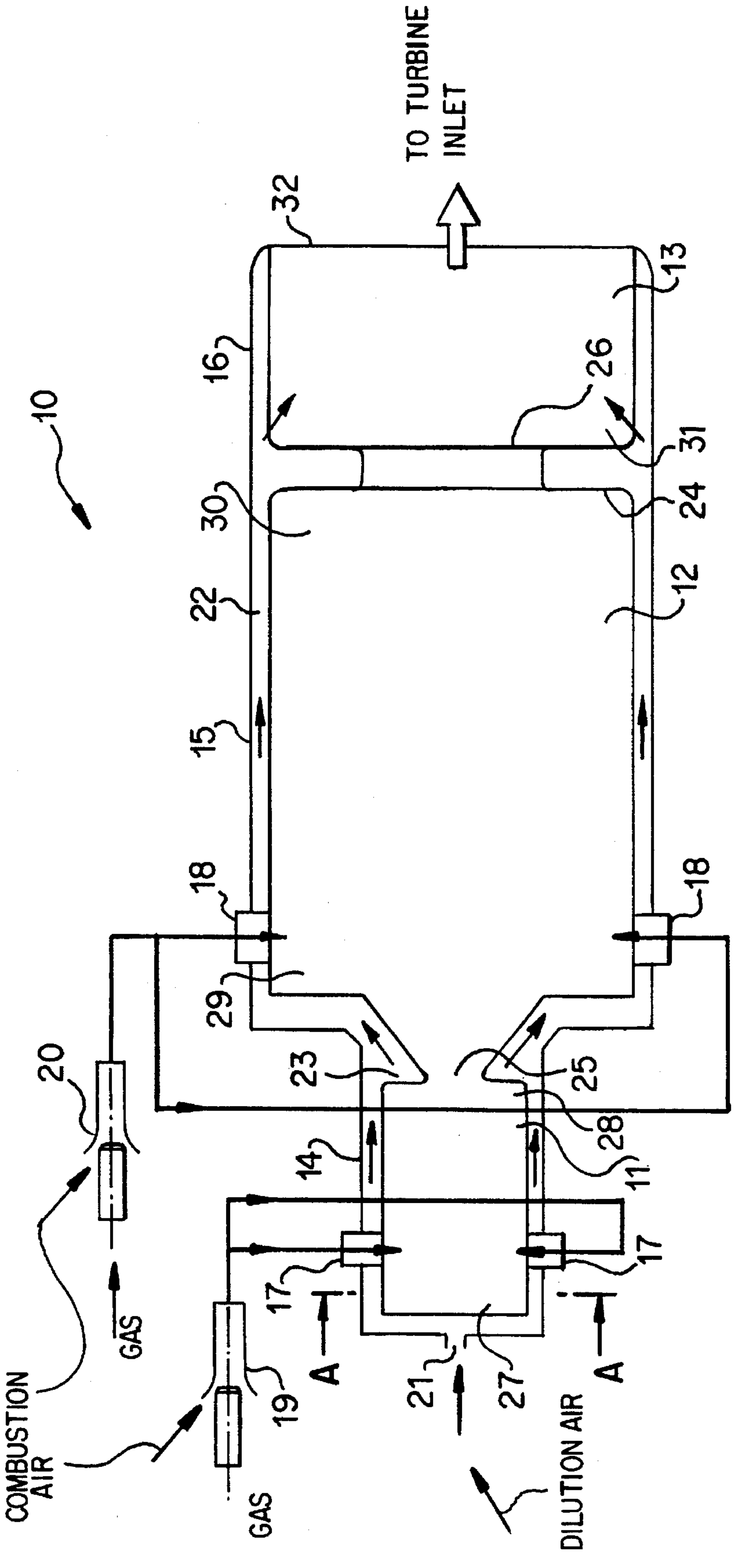
FIG. 1 is a schematic diagram of a fixed geometry combustor for a gas turbine in accordance with one embodiment of this invention.

FIG. 1 shows a schematic diagram of a fixed geometry combustor for a gas turbine in accordance with one embodiment of this invention, said combustor having two combustion chambers. However, it will be apparent to those skilled in the art that a fixed geometry combustor in accordance with this invention may have fewer than or more than two combustion chambers as shown in FIG. 1. Fixed geometry combustor 10, as shown, comprises first combustion chamber wall 14 defining first combustion chamber 11, second combustion chamber wall 15 defining second combustion chamber 12 and dilution chamber wall 16 defining dilution chamber 13. First combustion chamber 11, second combustion chamber 12 and dilution chamber 13 are aligned such that first downstream end 28 of first combustion chamber 11 is in communication with second upstream end 29 of second combustion chamber 12, and second downstream end 30 of second combustion chamber 12 is in communication with dilution upstream end 31 of dilution chamber 13. Dilution downstream end 32 of dilution chamber 13 is in communication with the inlet to a gas turbine (not shown).

Figure 2:
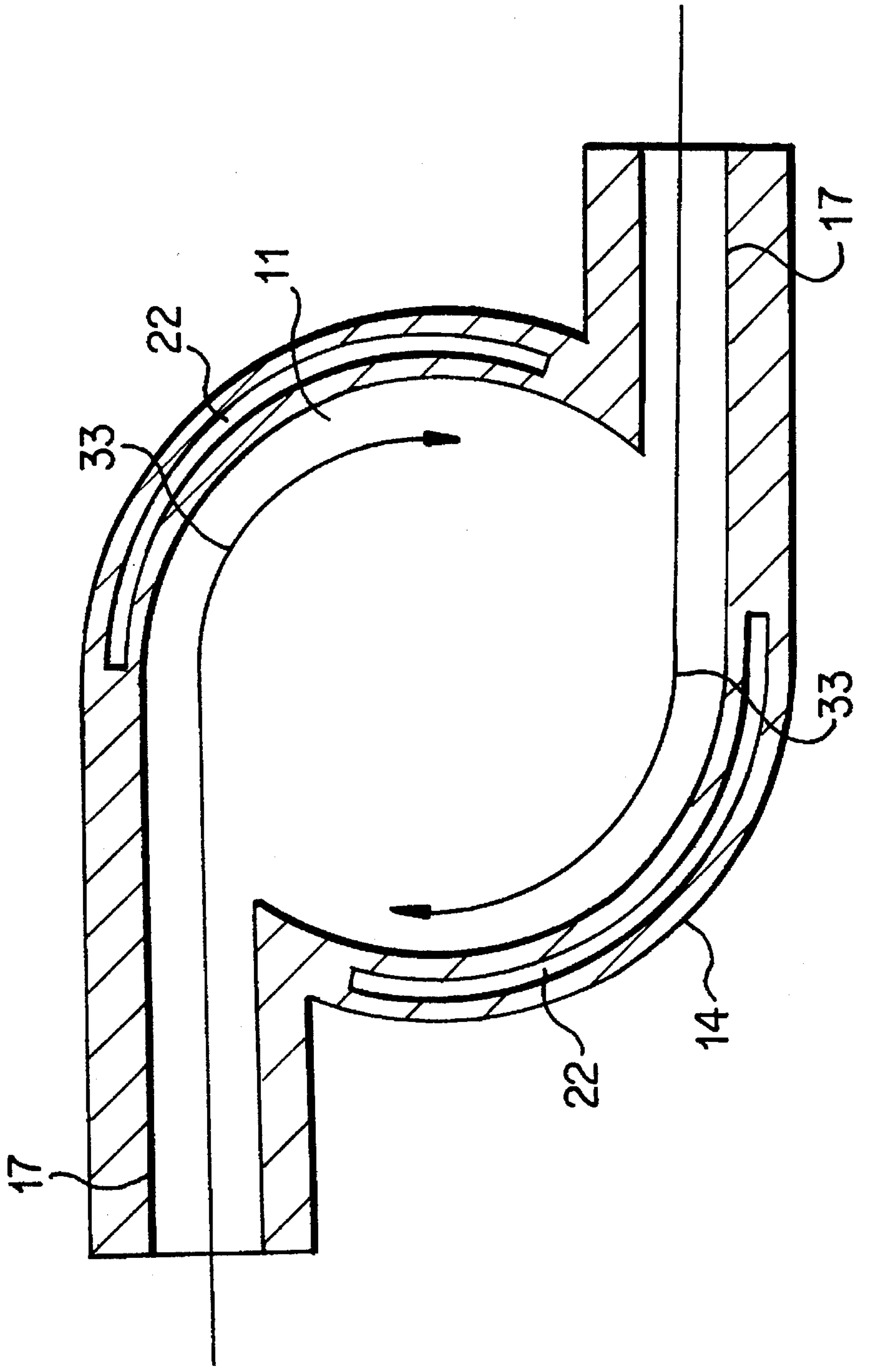
FIG. 2 is a cross-sectional view of the combustor shown in FIG. 1 along the line A—A.

Means for introducing a first mixture of fuel and combustion air into first combustion chamber 11 in the form of primary nozzle 17 is connected to first combustion chamber wall 14 and is in communication with first combustion chamber 11. Said means for introducing said first fuel/air mixture into first combustion chamber 11 further comprises first inspirator 19 in communication with primary nozzle 17. In accordance with a preferred embodiment of this invention, primary nozzle 17 is secured to first combustion chamber wall 14 whereby said first fuel/air mixture is introduced tangentially into first combustion chamber 11 as shown by arrows 33 in FIG. 2. As used in the specification and claims, the term "tangential" means "in a non-radial manner" so as to generate a cyclonic flow about the longitudinal centerline of fixed geometry combustor 10. Tangential injection of said first fuel/air mixture into first combustion chamber 11 is preferred for providing desired mixing of combustion products within fixed geometry combustor 10.

Similarly, means for introducing a second mixture of fuel and combustion air into second combustion chamber 12 are provided in the form of secondary nozzle 18 secured to second combustion chamber wall 15 and in communication with second combustion chamber 12. Said means for introducing said second fuel/air mixture into second combustion chamber 12 further comprises at least one secondary inspirator 20 in communication with said secondary nozzle 18. To provide the desired mixing of combustion products within fixed geometry combustor 10, secondary nozzle 18 is preferably mounted to second combustion chamber wall 15 such that said second fuel/air mixture is introduced into second combustion chamber 12 tangentially, thereby establishing a cyclonic flow pattern of combustion products similar to the flow pattern shown in FIG. 2 for products of combustion in first combustion chamber 11.

A critical feature of the fixed geometry combustor in accordance with this invention is the use of said primary and secondary inspirators for introduction of said first fuel/air mixture and said second fuel/air mixture, respectively, into fixed geometry combustor 10. By using said inspirators 19, 20, as the amount of fuel, preferably natural gas, introduced into fixed geometry combustor 10 increases, the amount of combustion air mixed with said fuel increases automatically to provide the requisite . stoichiometry for complete combustion of the fuel within fixed geometry combustor 10. Thus, as the load on the gas turbine to which fixed geometry combustor 10 is connected increases, fuel and air are automatically, correspondingly adjusted for said increase in turbine load. In addition, combustion air introduced into fixed geometry combustor 10 is varied in a manner which requires no moving parts external to the turbine.

Fixed geometry combustor 10 further comprises means for introducing dilution air into dilution chamber 13, said means comprising each of said first combustion chamber wall 14, said second combustion chamber wall 15 and said dilution chamber wall 16 having annular passage 22 around first combustion chamber 11, second combustion chamber 12 and dilution chamber 13, respectively. Annular passage 22 is in communication with dilution chamber 13. Said means for introducing dilution air into dilution chamber 13 further comprises means for introducing dilution air into annular passage 22 in the form of dilution air inlet 21 disposed at first upstream end 27 of first combustion chamber 11. Accordingly, the amount of dilution air introduced into dilution chamber 13 is related to the amount of combustion products generated in first combustion chamber 11 and second combustion chamber 12, said combustion products flowing through dilution chamber 13 into the gas turbine inlet. As the amount of combustion products flowing through fixed geometry combustor 10 increases, the amount of dilution air introduced into dilution chamber 13 increases. Thus, as the load on the turbine changes, the amount of combustion air and dilution air in fixed geometry combustor 10 is correspondingly varied without resorting to any moving parts other than the turbine itself.

In accordance with a preferred embodiment of this invention, each of said first combustion chamber 11, second combustion chamber 12 and dilution chamber 13 is cylindrical in shape, thereby promoting the cyclonic flow of combustion products and dilution air through fixed geometry combustor 10. To provide the requisite stable combustion within fixed geometry combustor 10, the diameter of first combustion chamber 11 is preferably less than the diameter of second combustion chamber 12.

In accordance with one embodiment of the fixed geometry combustor of this invention, first orifice wall 23 is disposed between first downstream end 28 of first combustion chamber 11 and second upstream end 29 of second combustion chamber 12, first orifice wall 23 forming first orifice 25 between first combustion chamber 11 and second combustion chamber 12. In accordance with a preferred embodiment of fixed geometry combustor 10 of this invention, first orifice 25 diverges in a direction from first combustion chamber 11 to second combustion chamber 12.

In accordance with another embodiment of the fixed geometry combustor of this invention, second orifice wall 24 is disposed between second downstream end 30 of second combustion chamber 12 and dilution upstream end 31 of dilution chamber 13, second orifice wall 24 forming second orifice 26.

A process for combustion of a fuel in a gas turbine combustor in accordance with one embodiment of this invention comprises mixing a first portion of a fuel and combustion air by inspirating the combustion air with the first portion of fuel to form a first fuel/air mixture. A second portion of fuel and combustion air are mixed by inspirating the second portion of combustion air with the second portion of fuel, forming a second fuel/air mixture. The first fuel/air mixture is introduced into first combustion chamber 11 of fixed geometry combustor 10 and the second fuel/air mixture is introduced into second combustion chamber 12 of fixed geometry combustor 10. Second combustion chamber 12 is disposed downstream of first combustion chamber 11 and in communication with first combustion chamber 11. Dilution air is introduced into dilution chamber 13 of fixed geometry combustor 10, dilution chamber 13 disposed downstream of second combustion chamber 12 and in communication with second combustion chamber 12. Said first fuel/air mixture and said second fuel/air mixture are burned in fixed geometry combustor 10, forming products of combustion. The products of combustion are mixed with dilution air in dilution chamber 13 and the resulting dilute combustion products are exhausted into a gas turbine.

A critical feature of the process of this invention is the requirement that the amount of fuel combusted in fixed geometry combustor 10 is regulated by the size of the load on the gas turbine. In addition, the amount of dilution air introduced into dilution chamber 13 is also regulated by the size of the load on the gas turbine.

In a preferred embodiment of the process of this invention, at least one of the first fuel/air mixture and the second fuel/air mixture is introduced tangentially into fixed geometry combustor 10.

While in the foregoing specification this invention has been described in relation to certain preferred embodiments thereof and many details have been set forth for purpose of illustration, it will be apparent to those skilled in the art that the invention is susceptible to additional embodiments and that certain of the details described herein can be varied considerably without departing from the basic principles of the invention.

We claim:

1. A process for combustion of a fuel in a gas turbine combustor comprising:

mixing a fuel and combustion air, forming a fuel/air mixture whereby the amount of combustion air is adjusted in response to a load on said gas turbine without employing any moving parts external to said gas turbine so as to maintain about a constant total amount of air flowing into said combustor;

introducing said fuel/air mixture into at least one combustion chamber of a fixed geometry combustor;

introducing a dilution air into a dilution chamber of said fixed geometry combustor whereby the amount of dilution air is adjusted in response to said load on said gas turbine without employing any moving parts external to said gas turbine so as to maintain about a constant total amount of air flowing into said combustor, said dilution chamber disposed downstream of said at least one combustion chamber and in communication with said at least one combustion chamber;

burning said fuel/air mixture in said fixed geometry combustor, forming products of combustion;

mixing said combustion products with said dilution air in said dilution chamber; and exhausting said dilute combustion products into said gas turbine.

2. A process in accordance with claim 1, wherein said fuel/air mixture is introduced tangentially into said at least one combustion chamber.

3. In a fixed geometry combustor for a gas turbine comprising at least one combustion chamber wall defining at least one combustion chamber having an upstream end and a downstream end, a dilution chamber wall defining a dilution chamber downstream of said at least one combustion chamber and in communication with said at least one combustion chamber, said dilution chamber having a dilution upstream end and a dilution downstream end, said dilution downstream end in communication with a gas turbine inlet, means for introducing a mixture of fuel and combustion air into said at least one combustion chamber, and means for introducing dilution air into said dilution chamber, the improvement comprising:

said means for introducing said mixture of fuel and combustion air into said at least one combustion chamber and said means for introducing dilution air into said dilution chamber adjusting the amount of combustion air and dilution air introduced into said at least one combustion chamber and said dilution chamber, respectively, in response to changes in the load on said gas turbine without employing any moving parts external to said gas turbine so as to maintain about a constant total amount of air flowing into said combustor.

4. In a fixed geometry combustor in accordance with claim 3, wherein said means for introducing said mixture of fuel and combustion air into said at least one combustion chamber comprises at least one inspirator in communication with said at least one combustion chamber.

5. In a fixed geometry combustor in accordance with claim 4, wherein said at least one combustion chamber wall defines a plurality of combustion chambers and said means for introducing said mixture of fuel and combustion air comprises said at least one inspirator in communication with said plurality of combustion chambers.

6. In a fixed geometry combustor in accordance with claim 5, wherein said means for introducing said mixture of fuel and combustion air comprises at least one said at least one inspirator in communication with each of said combustion chambers.

7. In a fixed geometry combustor in accordance with claim 4, wherein said means for introducing said mixture of fuel and combustion air into said at least one combustion chamber comprises at least one nozzle secured to said at least one combustion chamber wall, said at least one nozzle in communication with said at least one combustion chamber and said at least one inspirator.

8. In a fixed geometry combustor in accordance with claim 7, wherein said at least one nozzle is tangentially mounted whereby said mixture of fuel and combustion air is tangentially introduced into said at least one combustion chamber.

9. In a fixed geometry combustor in accordance with claim 3, wherein said means for introducing said dilution air into said dilution chamber comprises said at least one combustion chamber wall forming an annular passage around said at least one combustion chamber and at least a portion of said dilution chamber, said annular passage in communication with said dilution chamber, and means for introducing said dilution air into said annular passage in communication with said annular passage.

10. In a fixed geometry combustor in accordance with claim 5, wherein said at least one combustion chamber wall defines a first combustion chamber having a first upstream end and a first downstream end, a second combustion chamber having a second upstream end and a second downstream end and said dilution chamber, and said means for introducing said mixture of fuel and combustion air comprises at least one primary said at least one inspirator in communication with said first combustion chamber and at least one secondary said at least inspirator in communication with said second combustion chamber.

11. In a fixed geometry combustor in accordance with claim 10, wherein said means for introducing said mixture of fuel and combustion air further comprises at least one primary nozzle secured to said at least one combustion chamber wall, said at least one primary nozzle in communication with said first combustion chamber and said at least one primary inspirator and at least one secondary nozzle secured to said at least one combustion chamber wall, said at least one secondary nozzle in communication with said second combustion chamber and said at least one secondary inspirator.

12. In a fixed geometry combustor in accordance with claim 11, wherein each of said first combustion chamber, said second combustion chamber and said dilution chamber is cylindrical, the diameter of said first combustion chamber being less than the diameter of said second combustion chamber.

13. In a fixed geometry combustor in accordance with claim 10, wherein a first orifice wall is disposed between said first downstream end of said first combustion chamber and said second upstream end of said second combustion chamber, said first orifice wall forming a first orifice between said first combustion chamber and said second combustion chamber.

14. In a fixed geometry combustor in accordance with claim 13, wherein said first orifice diverges in a direction from said first combustion chamber to said second combustion chamber.

15. In a fixed geometry combustor in accordance with claim 10, wherein a second orifice wall is disposed between said second downstream end of said second combustion chamber and said dilution chamber, said second orifice wall forming a second orifice between said second combustion chamber and said dilution chamber.

16. In a fixed geometry combustor in accordance with claim 8, wherein at least one of said at least one primary nozzle and said at least one secondary nozzle is tangentially mounted whereby at least one of a first portion of said mixture of fuel and combustion air and a second portion of said mixture of fuel and combustion air is tangentially introduced into at least one of said first combustion chamber and said second combustion chamber.

17. A fixed geometry combustor for a gas turbine comprising:

at least one combustion chamber wall defining at least one combustion chamber having an upstream end and a downstream end;

at least one dilution chamber wall defining a dilution chamber disposed downstream of said at least one combustion chamber and in communication with said at least one combustion chamber;

combustion means for introducing a fuel/air mixture into said at least one combustion chamber; and dilution means for introducing dilution air into said dilution chamber, said combustion means and said dilution means adjusting the amount of combustion air and dilution air introduced into said at least one combustion chamber and said dilution chamber, respectively, in response to changes in the load on said gas turbine without employing any moving parts external to said gas turbine so as to maintain about a constant total amount of air flowing into said combustor.

18. A fixed geometry combustor in accordance with claim 17, wherein said combustion means comprises at least one primary inspirator in communication with said at least one combustion chamber.

19. A fixed geometry combustor in accordance with claim 18, wherein said combustion means for introducing said fuel/air mixture into said at least one combustion chamber comprises at least one nozzle secured to said at least one combustion chamber wall, said at least one nozzle in communication with said at least one primary inspirator and said at least one combustion chamber.

20. A fixed geometry combustor in accordance with claim 19, wherein said at least one nozzle is tangentially mounted whereby said fuel/air mixture is tangentially introduced into said at least one combustion chamber.

21. A fixed geometry combustor in accordance with claim 17, wherein said dilution means for introducing said dilution air into said dilution chamber comprises said at least one combustion chamber wall forming an annular passage around said at least one combustion chamber and at least a portion of said dilution chamber, said annular passage in communication with said dilution chamber, and means for introducing said dilution air into said annular passage in communication with said annular passage.

22. A fixed geometry combustor in accordance with claim 17, wherein said at least one combustion chamber wall defines a first combustion chamber having a first upstream end and a first downstream end and a second combustion chamber disposed downstream of said first combustion chamber in communication with said first combustion chamber, said second combustion chamber having a second upstream end and a second downstream end, said dilution chamber is disposed downstream of said second combustion chamber and in communication with said second combustion chamber, said dilution chamber having a dilution upstream end and a dilution downstream end, said dilution downstream end in communication with a gas turbine inlet, and said combustion means further comprises said at least one primary inspirator in communication with said first combustion chamber and at least one secondary inspirator in communication with said second combustion chamber.

23. A fixed geometry combustor in accordance with claim 22, wherein said combustion means for introducing said fuel/air mixture further comprises at least one primary nozzle secured to said at least one combustion chamber wall, said primary nozzle in communication with said first combustion chamber and Said at least one primary inspirator, and at least one secondary nozzle secured to said at least one combustion chamber wall, said secondary nozzle in communication with said second combustion chamber and said at least one secondary inspirator.

24. A fixed geometry combustor in accordance with claim 22, wherein said dilution means for introducing said dilution air into said dilution chamber comprises said at least one combustion chamber wall forming an annular passage around said first combustion chamber, said second combustion chamber and said dilution chamber, said annular passage in communication with said dilution chamber, and means for introducing said dilution air into said annular passage in communication with said annular passage.

25. A fixed geometry combustor in accordance with claim 22, wherein each of said first combustion chamber, said second combustion chamber and said dilution chamber is cylindrical, the diameter of said first combustion chamber being less than the diameter of said second combustion chamber.

26. A fixed geometry combustor in accordance with claim 22, wherein a first orifice wall is disposed between said first downstream end of said first combustion chamber and said second upstream end of said second combustion chamber, said first orifice wall forming a first orifice between said first combustion chamber and said second combustion chamber.

27. A fixed geometry combustor in accordance with claim 26, wherein said first orifice diverges in a direction from said first combustion chamber to said second combustion chamber.

28. A fixed geometry combustor in accordance with claim 26, wherein a second orifice wall is disposed between said second downstream end of said second combustion chamber and said dilution upstream end of said dilution chamber, said second orifice wall forming a second orifice between said second combustion chamber and said dilution chamber.

29. A fixed geometry combustor in accordance with claim 23, wherein at least one of said at least one primary nozzle and said at least one secondary nozzle is tangentially mounted whereby said fuel/air mixture is tangentially introduced into at least one of said first combustion chamber and said second combustion chamber.

* * * * *